(12) United States Patent
Yavas

(10) Patent No.: US 12,284,313 B1
(45) Date of Patent: Apr. 22, 2025

(54) SYSTEM AND METHOD FOR REAL-TIME IDENTIFICATION OF FRAUDULENT VOICE CALLS

(71) Applicant: Cem Yavas, Izmir-Karsiyaka (TR)

(72) Inventor: Cem Yavas, Izmir-Karsiyaka (TR)

(*) Notice: Subject to any disclaimer, the term of this patent is extended or adjusted under 35 U.S.C. 154(b) by 0 days.

(21) Appl. No.: 18/921,726

(22) Filed: Oct. 21, 2024

(51) Int. Cl.
  *H04M 3/42* (2006.01)
  *G10L 15/02* (2006.01)
  *G10L 15/26* (2006.01)

(52) U.S. Cl.
  CPC ......... *H04M 3/42085* (2013.01); *G10L 15/02* (2013.01); *G10L 15/26* (2013.01)

(58) Field of Classification Search
  CPC ..... H04M 3/42085; G10L 15/02; G10L 15/26
  See application file for complete search history.

(56) References Cited

U.S. PATENT DOCUMENTS

| | | | |
|---|---|---|---|
| 7,406,159 B2 | 7/2008 | Russell | |
| 10,484,532 B1* | 11/2019 | Newman | H04W 12/12 |
| 10,616,411 B1* | 4/2020 | Chang | H04M 3/2281 |
| 10,623,557 B2 | 4/2020 | Kung et al. | |
| 11,019,090 B1* | 5/2021 | Smith | G06F 21/40 |
| 11,089,154 B2* | 8/2021 | Kim | G10L 15/1815 |
| 11,102,344 B1* | 8/2021 | Buentello | G10L 15/1822 |
| 11,178,275 B2* | 11/2021 | Wang | H04M 3/2281 |
| 11,615,332 B2* | 3/2023 | Williams | G06F 16/285 |
| | | | 706/12 |
| 11,632,459 B2* | 4/2023 | Chawla | H04L 63/0245 |
| | | | 379/35 |
| 2002/0010715 A1* | 1/2002 | Chinn | G06F 16/957 |
| | | | 715/236 |
| 2002/0072900 A1* | 6/2002 | Keough | G10L 13/033 |
| | | | 704/220 |
| 2019/0020759 A1* | 1/2019 | Kuang | H04W 12/00 |
| 2020/0358898 A1* | 11/2020 | Singer | G10L 17/00 |
| 2021/0136200 A1* | 5/2021 | Li | G10L 17/26 |
| 2025/0030727 A1* | 1/2025 | Rodriguez Bravo | |
| | | | H04L 63/1441 |

FOREIGN PATENT DOCUMENTS

| | | |
|---|---|---|
| CN | 106506769 A | 3/2017 |
| CN | 111314359 A | 6/2020 |
| CN | 1159423241 A | 4/2023 |

* cited by examiner

Primary Examiner — Lisa Hashem
(74) Attorney, Agent, or Firm — Sagacity Legal PLLC

(57) ABSTRACT

A system for identification of a fraudulent voice call in real-time is described. The system includes a first device configured to receive a voice call originating from a second device and generate a call forward request. A server is configured to, in response to the call forward request, divide the voice call into a plurality of audio signals and analyze one or more audio signals to identify whether an audio originating from the second device is a cloned voice or a human voice. The server is configured to analyze the audio signal along with one or more preceding audio signals to determine a risk score associated with an identification of a fraudulent activity during the voice call and identify the voice call as the fraudulent voice call. The server is configured to trigger an alert in the first device to indicate that the voice call is a fraudulent voice call.

18 Claims, 9 Drawing Sheets

SYSTEM AND METHOD FOR REAL-TIME IDENTIFICATION OF FRAUDULENT VOICE CALLS

BACKGROUND OF THE INVENTION

Fraudulent ("fraud") calls in telecommunications pose a significant challenge to service providers and consumers alike, leading to substantial financial losses and eroding trust in communication services. According to data from the Federal Trade Commission's consumer sentinel network, 298,210 reports were made with phone calls as the contact method, leading to a total loss of USD 851 million in the year 2023, while 297,085 reports resulted in USD 794 million in losses in the year 2022. After being contacted, consumers used various payment methods to pay scammers, with bank transfers, cryptocurrency, and wire transfers leading to significant losses. These methods resulted in USD 3.3 billion in losses in the year 2022 and USD 3.6 billion in losses in the year 2023. Traditional fraud call detection systems often rely on post-call analysis, which not only delays the detection of fraudulent activities but also lacks the capability to prevent fraud in real-time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
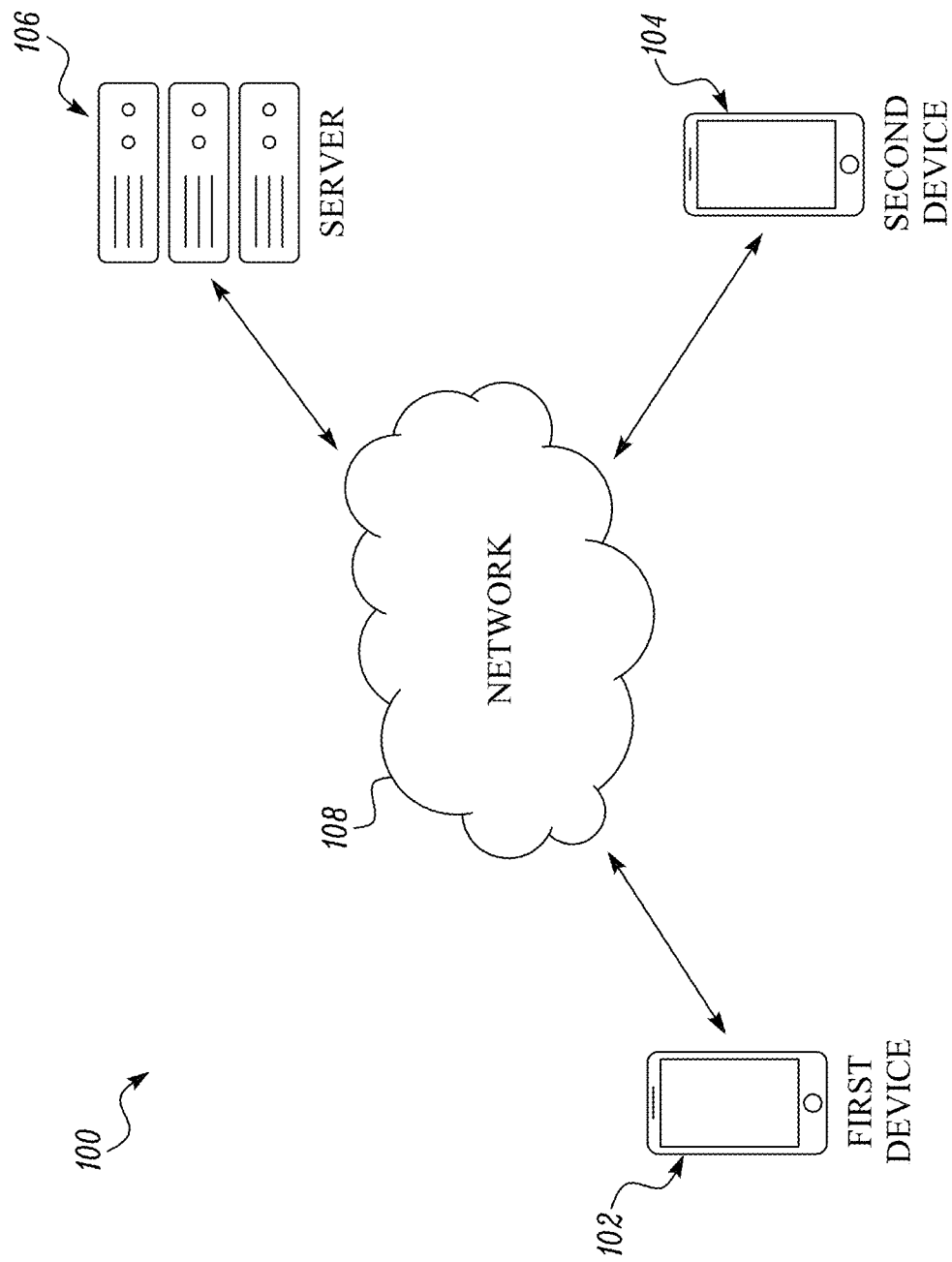
FIG. 1 illustrates an exemplary system for identification of a fraudulent voice call in real-time, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the description with details that will be readily apparent to those of ordinary skill in the art having the benefit of the description herein.

DETAILED DESCRIPTION OF THE INVENTION

In one aspect, a system for identification of a fraudulent voice call in real-time is described. The system includes a first device communicatively coupled through a network to a second device and a server communicatively coupled to the first device and the second device through the network. The first device is configured to receive a voice call originating from the second device and determine an absence of details associated with the second device in the first device. The first device is further configured to generate a call forward request based on the absence of details. The server is configured to receive the call forward request from the first device via the network. In response to the call forward request, the server is configured to divide the voice call from the second device to the first device into a plurality of audio signals in real time during the voice call and analyze, using at least two artificial intelligence models, one or more audio signals originated from the second device of the plurality of audio signals to identify whether an audio originating from the second device is a cloned voice or a human voice. The server is further configured to analyze, upon reception of each audio signal of the plurality of audio signals, the audio signal along with one or more preceding audio signals to continuously determine a risk score associated with an identification of a fraudulent activity during the voice call and identify the voice call as the fraudulent voice call upon identifying the audio originating from the second device as a cloned voice or when the risk score associated with the identification of the fraudulent activity during the voice call is greater than a predetermined risk value. Further, the server is configured to trigger an alert in the first device during the voice call to indicate that the voice call from the second device is a fraudulent voice call in response to the identifying.

In another aspect, a method for identification of a fraudulent voice call in real-time is described. The method includes receiving, by a first device communicatively coupled through a network to a second device, a voice call originating from the second device and determining, by the first device, an absence of details associated with the second device in the first device. The method further includes generating, by the first device, a call forward request based on the absence of details and receiving, by a server communicatively coupled to the first device and the second device through the network, the call forward request from the first device via the network. In response to the call forward request, the method includes dividing, by the server, the voice call from the second device to the first device into a plurality of audio signals in real time during the voice call and analyzing, by the server using at least two artificial intelligence models, one or more audio signals originated from the second device of the plurality of audio signals to identify whether an audio originating from the second device is a cloned voice or a human voice. Further, the method includes analyzing, by the server, upon reception of each audio signal of the plurality of audio signals, the audio signal along with one or more preceding audio signals to continuously determine a risk score associated with an identification of a fraudulent activity during the voice call and identifying, by the server, the voice call as the fraudulent voice call upon identifying the audio originating from the second device as a cloned voice or when the risk score associated with the identification of the fraudulent activity during the voice call is greater than a predetermined risk value. The method further includes triggering, by the server, an alert in the first device during the voice call to indicate that the voice call from the second device is a fraudulent voice call in response to the identifying.

In yet another aspect, a system for identification of a fraudulent voice call in real-time is described. The system includes a server communicatively coupled to a first device and a second device through a network. The server is configured to obtain a voice call originating from the second device to the first device and divide the voice call from the second device to the first device into a plurality of audio signals in real time during the voice call. The server is further configured to analyze, using at least two artificial intelligence models, one or more audio signals originated from the second device of the plurality of audio signals to identify whether an audio originating from the second device is a cloned voice or a human voice and analyze, upon reception of each audio signal of the plurality of audio signals, the audio signal along with one or more preceding audio signals to continuously determine a risk score associated with an identification of a fraudulent activity during the voice call. Further, the server is configured to identify the voice call as the fraudulent voice call upon identifying the audio originating from the second device as a cloned voice or when the risk score associated with the identification of the fraudulent activity during the voice call is greater than a predetermined risk value and trigger an alert in the first device during the voice call to indicate that the voice call from the second device is a fraudulent voice call in response to the identifying.

FIG. 1 illustrates a system 100 for identification of a fraudulent voice call in real time in accordance with various embodiments. The fraudulent voice call is a phone scam, also known as voice phishing or vishing, that uses deception to trick people into giving away sensitive information. For example, the sensitive information includes, but is not limited to, personal details, such as birthday, mailing address, email address, and business contact information, and financial information, such as bank account numbers, credit card numbers, and login credentials. In accordance with various embodiments, the system 100 is configured to identify and notify devices receiving such fraudulent voice calls in real-time to prevent disclosure of the sensitive information.

The system 100 includes a first device 102, a second device 104, and a server 106. The first device 102, the second device 104, and the server 106 are communicatively coupled to each other via a network 108. The network 108 includes, but is not limited to, a wide area network (WAN) (for example, a transport control protocol/internet protocol (TCP/IP) based network), a cellular network, or a local area network (LAN) employing any of a variety of communications protocols as is now known or in the future developed. Although FIG. 1 describes the system 100 including the first device 102 and the second device 104, for simplicity and clarity, it will be appreciated that, in some embodiments, the system 100 includes more than two devices.

The first device 102 and the second device 104 are communication devices that are configured to initiate, transmit, and receive voice calls through the network 108. For example, the first device 102 and the second device 104 include smartphones, tablets, cellular phones, or any other communication device now known or developed in the future. In accordance with various embodiments, the first device 102 is configured to receive a voice call originating from the second device 104 through the network 108. The voice call includes a plurality of audio signals (for example, voice transmissions), signaling information, call metadata, security information, and other data known or developed in the future. The voice call initiated by the second device 104 can be a human-initiated calls, computer-generated calls, Voice over Internet Protocol (VOIP) calls, Public Switched Telephone Network (PSTN) calls, or any other type of call now known or in the future developed.

In accordance with various embodiments, upon receiving the voice call, the first device 102 is configured to generate and transmit a call forward request to the server 106 based on one or more user pre-defined configurations. The user pre-defined configurations include a reception of a voice call from an unknown number, a reception of a voice call from another country, reception of a voice call from any government agency, and any other configuration now known or in the future identified. It will be appreciated that the user pre-defined configurations can be any configuration for identifying potential scam callers now known or in the future developed and is not limited to the exemplary configurations listed above. For example, when the phone number is unknown to the first device 102, the first device 102 is configured to generate and transmit the call forward request to the server 106. The first device 102 is configured to transmit the call forward request, for example, by using one or more session initiation protocol (SIP) messages. By transmitting the call forward request to the server 106, the first device 102 forwards the voice call from the second device 104 to the server 106, thereby enabling real-time monitoring of the voice call by the server 106 while maintaining the voice call between the first device 102 and the second device 104.

In some embodiments, the first device 102 is not required to transmit the call forward request to the server 106, for example, in scenarios, when the server 106 is integrated with one or more network servers (not shown) linked with the network 108. In such cases, the voice call is automatically received by the server 106 using media forking based on the one or more user pre-defined configurations. As known in the art, media forking enables an application to deliver a voice call while simultaneously duplicating call media corresponding to the voice call to multiple recipients. By media forking, the server 106 (or the one or more network servers) duplicates and redirects the voice call originating from the second device 104 to the first device 102 and the server 106 simultaneously, thereby enabling the server 106 to receive the voice call between the first device 102 and the second device 104.

Figure 2:
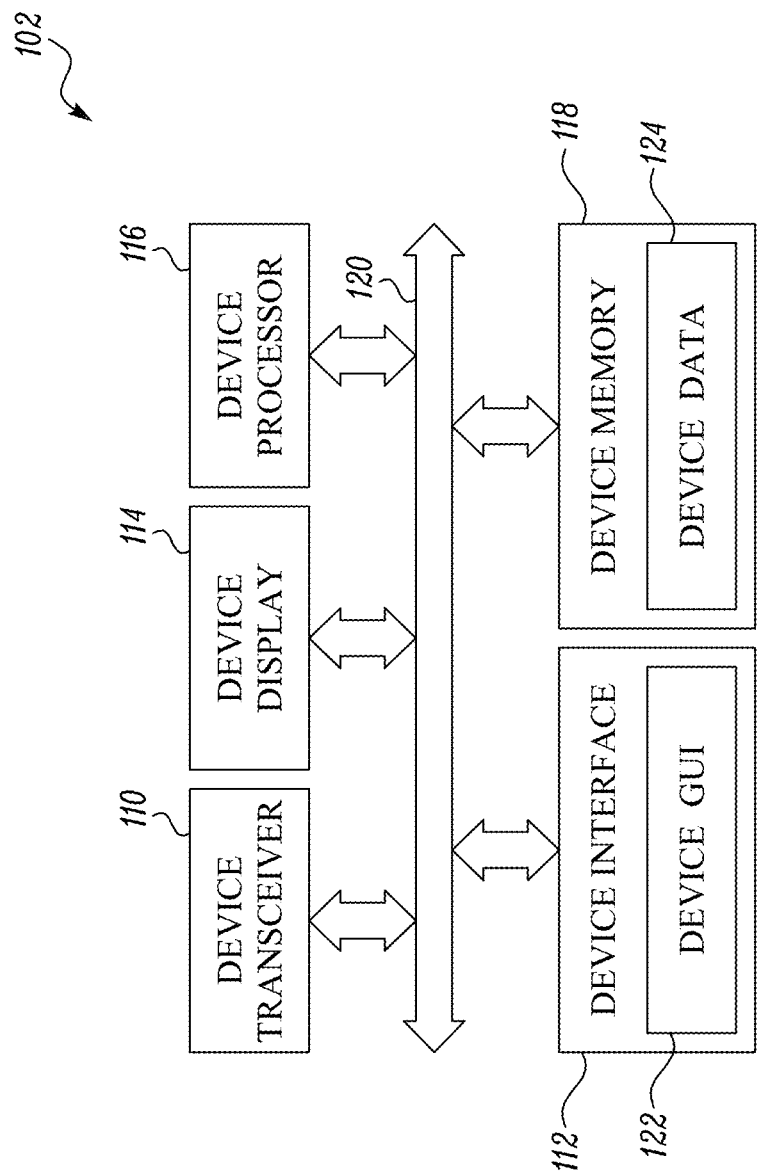
FIG. 2 illustrates a block diagram of an exemplary first device, in accordance with some embodiments.

In accordance with various embodiments, the first device 102 also operates as an interface for a corresponding first user interacting with the server 106. The first device 102 includes a plurality of electrical and electronic components, providing power, operational control, communication, and the like within the first device 102. The various components of first device 102 will now be described hereinafter with respect to FIG. 2. It should be appreciated by those of ordinary skill in the art that FIG. 2 depicts the first device 102 in a simplified manner and a practical embodiment includes additional components and suitably configured logic to support known or conventional operating features that are not described in detail herein. Although the first device 102 is shown and described to be implemented within a single communication device, it is contemplated that the one or more components of the first device 102 are alternatively be implemented in a distributed computing environment.

Referring to FIG. 2, the first device 102 includes, among other components, a device transceiver 110, a device interface 112, a device display 114, a device processor 116, and a device memory 118. The components of the first device 102, including the device transceiver 110, the device interface 112, the device display 114, the device processor 116, and the device memory 118, cooperate with one another to enable operations of the first device 102. Each component communicates with one another via a device local interface 120. The device local interface 120 includes, but not limited to, one or more buses or other wired or wireless connections, as is known in the art. The device local interface 120 includes additional elements, which are omitted for simplicity, such as controllers, buffers (caches), drivers, repeaters, and receivers, among many others, to enable communications. Further, the device local interface 120 includes address, control, and/or data connections to enable appropriate communications among the aforementioned components.

As illustrated, the first device 102 includes the device transceiver 110 to receive voice calls from and initiate voice calls to other devices, such as, the second device 104. The device transceiver 110 is also configured to transmit one or more queries, the SIP messages to and receive one or more outputs from other devices, such as, the server 106. The device transceiver 110 includes a transmitter circuitry and a receiver circuitry to enable the first device 102 to communicate with the server 106 and the second device 104. In this regard, the transmitter circuitry includes appropriate circuitry to transmit the one or more queries to the server 106 and the voice call to the second device 104. Similarly, the receiver circuitry includes appropriate circuitry to receive the one or more outputs from the server 106 and the voice call from the second device 104. It will be appreciated by those of ordinary skill in the art that the first device 102 includes a single device transceiver 110 as shown, or alternatively separate transmitting and receiving components, for example but not limited to, a transmitter, a transmitting antenna, a receiver, and a receiving antenna.

In accordance with various embodiments, the device interface 112 is configured to receive the queries from and/or provide the outputs to the first user. The queries are provided via a touch screen display (such as, the device display 114), a camera, a touch pad, a keyboard, a microphone, a recorder, a mouse, or any other user input mechanism now known or developed in the future. The outputs are provided via a display device, such as the device display 114, a speaker, a haptic output, or any other output mechanism now known or developed in the future. The device interface 112 further includes a serial port, a parallel port, an infrared (IR) interface, a universal serial bus (USB) interface and/or any other interface herein known or developed in the future.

In accordance with some embodiments, the device interface 112 includes a device graphical user interface (GUI) 122 through which the first user communicates with the server 106. The device GUI 122 is an application or web portal or any other suitable interface. The device GUI 122 includes one or more of graphical elements associated with providing the outputs, and the like. The graphical elements include, but not limited to one or more of dialogue boxes, window, web forms, and/or the like. The graphical elements are used in conjunction with text to prompt the first user for the queries or display the outputs to the first user in response to one or more instructions from the server 106.

The device display 114 is configured to display dialogue boxes, web forms, data, images, and the like. The device display 114 includes a display screen or a computer monitor now known or in the future developed. In accordance with some embodiments, the device display 114 is configured to display on the device GUI 122 the outputs associated with the fraudulent voice call.

The device memory 118 is a non-transitory memory configured to store a set of instructions that are executable by the device processor 116 to perform predetermined operations. For example, the device memory 118 includes any of the volatile memory elements (for example, random access memory (RAM)), nonvolatile memory elements (for example, read only memory (ROM)), and combinations thereof. Moreover, the device memory 118 incorporates electronic, magnetic, optical, and/or other types of storage media. In accordance with some embodiments, the device memory 118 is also configured to store data 124, such as, details (for example, phone numbers) associated with one or more calling devices known to the first user. In some embodiments, the data 124 also includes the one or more user pre-defined configurations and the application associated with the device GUI 122.

The device processor 116 is configured to execute the instructions stored in the device memory 118 to perform the predetermined operations, for example, the detailed functions of the first device 102 as will be described in the forthcoming description. The device processor 116 includes one or more microprocessors, microcontrollers, DSPs (digital signal processors), state machines, logic circuitry, or any other device or devices that process information or signals based on operational or programming instructions. The device processor 116 is implemented using one or more controller technologies, such as Application Specific Integrated Circuit (ASIC), Reduced Instruction Set Computing (RISC) technology, Complex Instruction Set Computing (CISC) technology, or any other similar technology now known or in the future developed. The device processor 116 is configured to cooperate with other components of the first device 102 to perform operations pursuant to communications and the one or more instructions from the server 106.

Referring back to FIG. 1, the server 106, upon receiving the call forward request or alternatively the voice call using the media forking, is configured to analyze the voice call to identify whether the voice call is a fraudulent voice call (as described in detail in the forthcoming description). The server 106, upon determining that the voice call originating from the second device 104 is the fraudulent voice call, triggers an alert on the first device 102 during the voice call. To this end, the server 106 triggers one or more of a visual alert, an audio alert, a haptic alert, and an electronic message on the first device 102 indicating detection of the fraudulent voice call.

Figure 3:
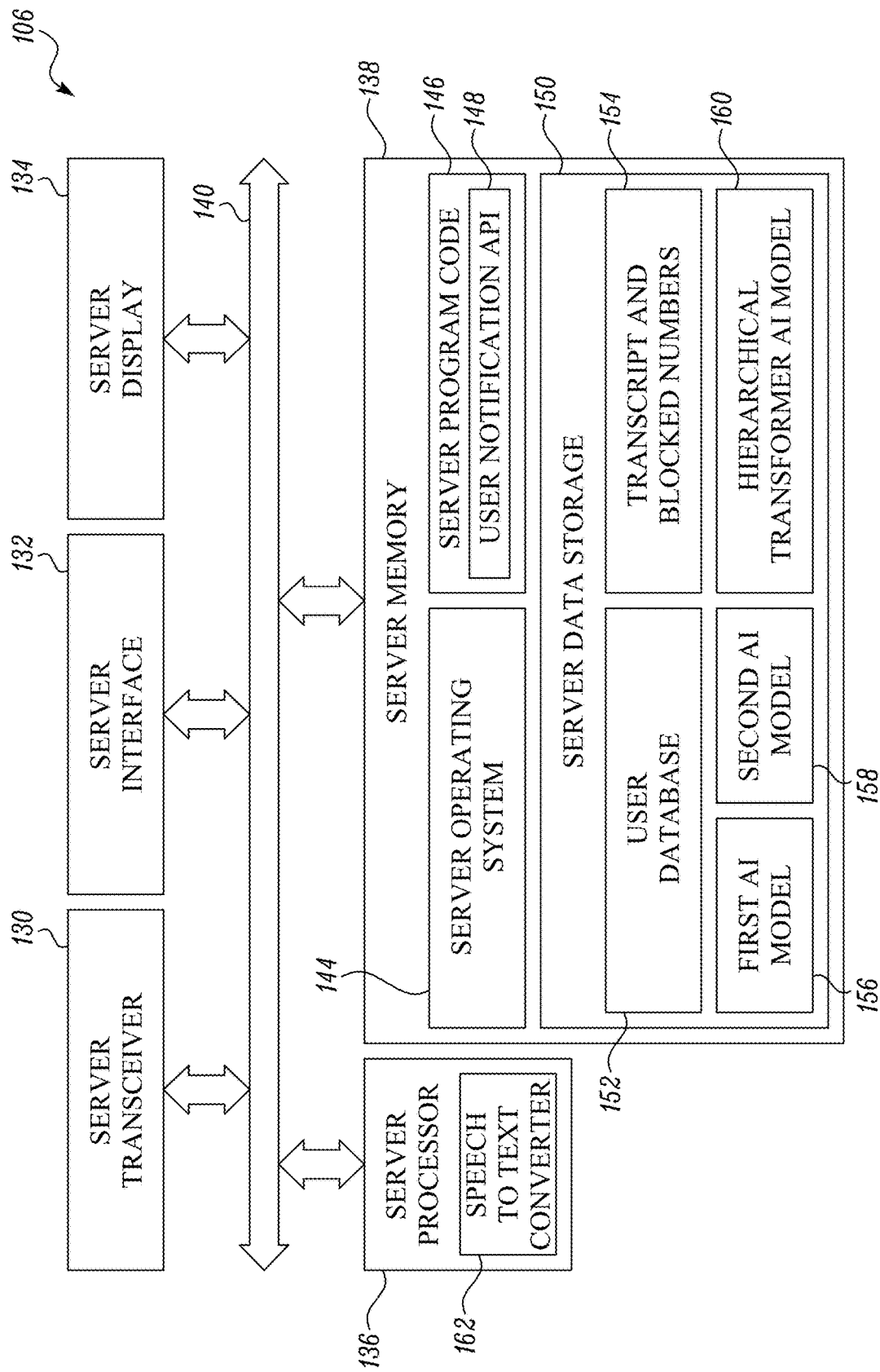
FIG. 3 illustrates a block diagram of an exemplary server for identification of the fraudulent voice call in real-time, in accordance with some embodiments.

Referring to FIG. 3, the server 106 includes a plurality of electrical and electronic components, providing power, operational control, communication, and the like within the server 106. For example, the server 106 includes, among other components, a server transceiver 130, a server interface 132, a server display 134, a server processor 136, and a server memory 138. It should be appreciated by those of ordinary skill in the art that FIG. 3 depicts the server 106 in a simplified manner and a practical embodiment includes additional components and suitably configured logic to support known or conventional operating features that are not described in detail herein. It will further be appreciated by those of ordinary skill in the art that the server 106 is a personal computer, desktop computer, tablet, smartphone, or any other computing device now known or developed in the future.

Further, although the server 106 is shown and described to be implemented within a single computing device, it is contemplated that the one or more components of the server 106 are alternatively be implemented in a distributed computing environment, without deviating from the scope of the claimed subject matter. It will further be appreciated by those of ordinary skill in the art that the server 106 alternatively functions within a remote server, cloud computing device, or any other remote computing mechanism now known or developed in the future. The server 106 is a cloud environment incorporating the operations of the server transceiver 130, the server interface 132, the server display 134, the server processor 136, and the server memory 138, and various other operating modules to serve as a software as a service model for the first device 102. In some embodiments, the server 106 is integrated with the one or more network servers (not shown). In an embodiment, the server 106 and the first device 102 are one computing device incorporating the operations of all the components of the server 106 and the first device 102. In an embodiment, the functionalities of the server 106 and the first device 102 are distributed in two or more computing devices.

The components of the server 106, including the server transceiver 130, the server interface 132, the server display 134, the server processor 136, and the server memory 138 communicates with one another via a server local interface 140. The server local interface 140 includes, namely, but not limited to, one or more buses or other wired or wireless connections, as is known in the art. The server local interface 140 have additional elements, but not limited to, such as controllers, buffers (caches), drivers, repeaters, and receivers, among many others, to enable communications. Further, the server local interface 140 includes address, control, and/or data connections to enable appropriate communications among the aforementioned components.

The server transceiver 130 includes a transmitter circuitry and a receiver circuitry (not shown) to enable the server 106 to communicate data to and acquire data or the voice call from other devices, such as, the first device 102, the second device 104, and the one or more network servers. In this regard, the transmitter circuitry includes appropriate circuitry to transmit data associated with the fraudulent voice call to the first device 102. Similarly, the receiver circuitry includes appropriate circuitry to receive the voice call between the first device 102 and the second device 104, and the queries associated with the fraudulent voice call from the first device 102. The transmitter circuitry and the receiver circuitry together form a wireless transceiver to enable wireless communication with the first device 102 and the second device 104. It will be appreciated by those of ordinary skill in the art that the server 106 includes a single server transceiver 130 as shown, or alternatively separate transmitting and receiving components, for example but not limited to, a transmitter, a transmitting antenna, a receiver, and a receiving antenna.

In some embodiments, the server interface 132 is configured to receive data from and/or provide output to a user. The data is provided via a touch screen display (such as, the server display 126), a camera, a touch pad, a keyboard, a microphone, a recorder, a mouse, or any other user input mechanism now known or developed in the future. The output is provided via a display device, such as the server display 134, a speaker, a haptic output, or any other output mechanism now known or developed in the future. The server interface 132 further includes a serial port, a parallel port, an infrared (IR) interface, a universal serial bus (USB) interface and/or any other interface herein known or developed in the future. The server display 134 is configured to display dialogue boxes, web forms, data, images, and the like. The server display 134 includes a display screen or a computer monitor now known or in the future developed.

The server processor 136 is configured to execute the instructions stored in the server memory 138 to perform the predetermined operations, for example, the detailed functions of the server 106 as will be described hereinafter. The server processor 136 includes one or more microprocessors, microcontrollers, DSPs (digital signal processors), state machines, logic circuitry, or any other device or devices that process information or signals based on operational or programming instructions. The server processor 136 are be implemented using one or more controller technologies, such as Application Specific Integrated Circuit (ASIC), Reduced Instruction Set Computing (RISC) technology, Complex Instruction Set Computing (CISC) technology, or any other technology now known or in the future developed. In accordance with various embodiments, the server processor 136 also includes a speech to text converter 162 to convert an audio signal into a text string. The speech to text converter 162 can be any text converter known in the art or developed in the future.

The server memory 138 is a non-transitory memory configured to store a set of instructions that are executable by the server processor 136 to perform the predetermined operations. For example, the server memory 138 includes any of the volatile memory elements (for example, random access memory (RAM)), nonvolatile memory elements (for example read only memory (ROM)), and combinations thereof. Moreover, the server memory 138 incorporates electronic, magnetic, optical, and/or other types of storage media. Note that, in some embodiments, the server memory 138 has a distributed architecture, where various components are situated remotely from one another, but are accessed by the server processor 136. The software in the server memory 138 includes one or more software programs, each of which includes an ordered listing of executable instructions for implementing logical functions. The software in the server memory 138 includes a server operating system 144 and server program code 146. The server operating system 144 controls the execution of other computer programs, such as, the server program code 146, and provides scheduling, input-output control, file and data management, memory management, and communication control and related services. The server program code 146 is configured to implement the various processes, algorithms, methods, techniques described herein. The server program code 146 includes a user notification application programming interface (API) 148 to send notifications to the first device 102 associated with the fraudulent voice calls, for example, through push notification, in-app notifications or any other notifications now known or in the future developed.

The server memory 138 further includes a server data storage 150 used to store data. In the exemplary embodiment of FIG. 3, the server data storage 150 is located internal to the server memory 138 of the server 106. Additionally, or alternatively (not shown), the server data storage 150 is located external to the server 106 such as, for example, an external hard drive connected to the server interface 132. In some embodiments (not shown), the server data storage 150 is located external and connected to the server 106 through a network. The server data storage 150 includes a user database 152 configured to store user data, such as, phone number, carrier, family, call history, the user pre-defined configurations, and so on, for every device registered with the server 106. The server data storage 150 is further configured to store data 154, such as, data associated with transcripts associated with the voice calls received by the devices registered with the server 106 and data associated with the blocked numbers (for example, one or more phone numbers through which the fraudulent voice calls were originated).

In accordance with various embodiments, the server data storage 150 is configured to store a plurality of artificial intelligence (AI) models 156, 158, 160 to analyze whether the voice call is a fraudulent voice call. The AI models 156, 158, 160 are configured to learn and adapt itself to continuous improvement in changing environments. The AI models 156, 158, 160 employ any one or combination of the following computational techniques: neural network, constraint program, fuzzy logic, classification, conventional artificial intelligence, symbolic manipulation, fuzzy set theory, evolutionary computation, cybernetics, data mining, approximate reasoning, derivative-free optimization, decision trees, and/or soft computing. The AI models 156, 158, 160 implement an iterative learning process. The learning is based on a wide variety of learning rules or training algorithms now known or in the future developed. In an embodiment, the learning rules include, for example, one or more of back-propagation, pattern-by-pattern learning, supervised learning, and/or interpolation. The AI models 156, 158, 160 are configured to implement one or more machine learning algorithms. In accordance with some embodiments of the invention, the machine learning algorithm utilizes any machine learning methodology, now known or in the future developed, for classification. For example, the machine learning methodology utilized includes one or a combination of: Linear Classifiers (Logistic Regression, Naive Bayes Classifier); Nearest Neighbor; Support Vector Machines; Decision Trees; Boosted Trees; Random Forest; and/or Neural Networks. The AI models 156, 158, 160 continually evolve specifics associated with identification of fraudulent voice calls in real time with new data inputs.

To this end, the server data storage 150 is configured to store a plurality of AI models, including but not limited to, a first AI model 156 and a second AI model 158 to analyze one or more audio signals originating from the second device 104 during the voice call. The first AI model 156 and the second AI model 158, when executed by the server processor 136, are configured to identify whether an audio originating from the second device 104 is a cloned voice or a human voice. The first AI model 156, when executed by the server processor 136, analyzes frequency components of the one or more audio signals originated from the second device during the voice call to determine a first confidence score indicative of whether the audio is a cloned voice or a human voice. For example, the first AI model 156 includes an XGBoost classifier, which is trained using features derived from Fractional Fourier Transforms (FRFT) and Fractional Mel Cepstral Coefficients (FRCC). The FRFT is used as a feature extraction technique to transform the voice signals into a domain that highlights specific characteristics useful for classification. The FRCC serves as the direct features input to the XGBoost model, representing the essential aspects of the voice signals in the frequency domain.

The second AI model 158, when executed by the server processor 136, is configured to determine a second confidence score indicative of whether the audio is a cloned voice or a human voice. The second AI model 158 is trained on datasets including a plurality of sample cloned voices and a plurality of sample human voices to identify the audio as a cloned voice or a human voice. The second AI model 158 involves fine-tuning a Wav2Vec2 model. The Wav2Vec2ClassificationHead module is utilized for classification, with the Wav2Vec feature extractor serving as the front-end for feature extraction. The model is trained using a Connectionist Temporal Classification (CTC) loss function.

Figure 4:
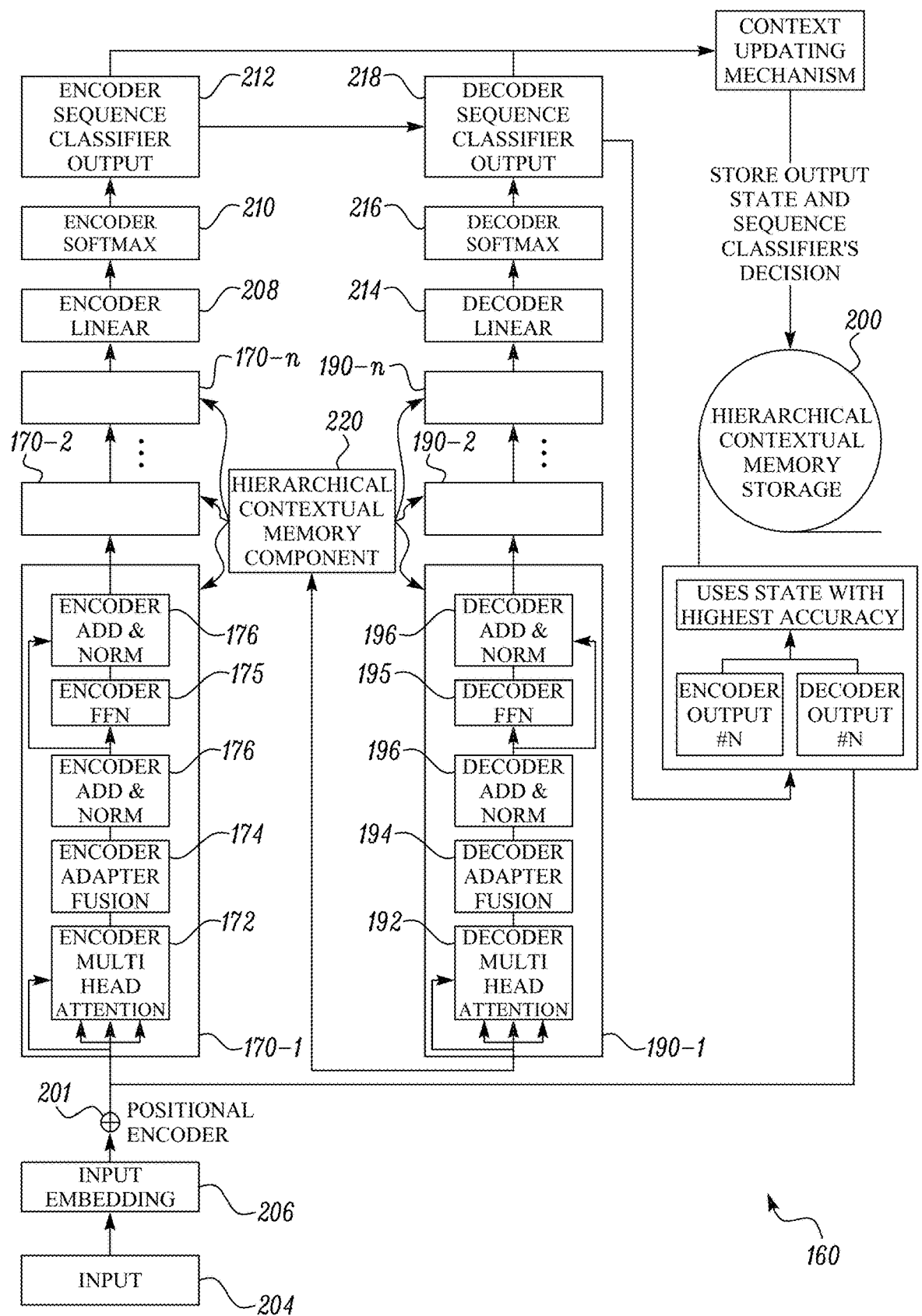
FIG. 4 illustrates a block diagram of a transformed artificial intelligence model executed by the server, in accordance with some embodiments.

The server data storage 150 is further configured to store a hierarchical transformer AI model 160 to determine a risk score associated with an identification of a fraudulent activity during the voice call when executed by the server processor 136. As shown in FIG. 4, the hierarchical transformer AI model 160 includes a plurality of encoders 170 (for example, 170-1, . . . 170-n) and a plurality of decoders 190 (for example, 190-1, . . . 190-n). Each encoder 170 (hereinafter interchangeably referred to as encoder layer) includes an encoder multihead attention layer 172 configured to process text strings provided as an input 204 and generate encoder attention outputs, when executed by the server processor 136. The processing of the text strings includes processing one or more specific identifiers in the text string. The attention outputs enable the hierarchical transformer AI model 160 to focus on specific parts of the input 204 when processing information. In some embodiments, the server processor 136 is configured to convert the input 204 into a format suitable for processing by the encoder multihead attention layer 172 via an input embedding layer 206. Each encoder 170 further includes an encoder adapter fusion 174 (hereinafter interchangeably referred to as an encoder adapter fusion layer) configured to combine and analyze the outputs from the encoder multihead attention layer 172 of the first encoder layer 170-1 to generate an initial encoder risk score associated with the identification of fraudulent activity, when executed by the server processor 136. The encoder adapter fusion layer 174 contains multiple context-specific encoder adapter models, each pre-trained on datasets corresponding to different fraudulent activities. These encoder adapter models dynamically adjust to select the most relevant adapter based on the input scenario, when executed by the server processor 136. As the data passes through subsequent encoder multi-head attention layers 172 and encoder adapter fusion layers 174 across all layers of the remaining encoders 170, each encoder adapter fusion layer 174 iteratively refines the encoder risk score by assessing new attention outputs and contributing contextually adjusted scores. The cumulative encoder risk score of each encoder 170 is sequentially passed to the next encoder 170, ensuring a hierarchical refinement process that increases the model's accuracy in identifying potentially fraudulent activities. Each encoder 170 also includes an encoder feed forward neural network layer (FFN) 175 which is placed in between a pair of encoder add and norm layer 176. The encoder add and norm layer 176 is configured to receive output from the encoder adapter fusion 174 and perform normalization on the outputs (for example, the encoder risk score) to prevent training instability, when executed by the server processor 136. The server processor 136 is configured to forward the normalized output to the encoder FFN 175 to learn more intricate patterns of data and refine the features extracted. The encoder risk score from the plurality of encoders 170 is passed through an encoder linear layer 208 that transforms the output (for example, the encoder risk score) from the plurality of encoders 170 into a higher dimensional space, when executed by the server processor 136. The output of the encoder linear layer 208 is further normalized by the server processor 136 by processing it through an encoder softmax layer 210. The normalized output is provided to an encoder sequence classifier output layer 212 that outputs an encoder classifier decision for each analyzed text string (for example, a sentence). The encoder outputs (for example, the encoder risk scores), encoder output state (for example, a detailed version of the encoder risk scores), and the encoder classifier decision for each analyzed sentence is stored by the server processor 136 in a hierarchical contextual memory storage 200. As each new text string is processed, the current text string is combined with a previous context (for example, the stored encoder outputs, the stored risk scores, the stored output states, and the stored classifier decision), analyzing the whole context for more accurate fraud detection. When a cumulative risk score across multiple text strings surpasses a specific threshold (for example, a predetermined risk value), the server processor 136 triggers the alert.

Each decoder 190 (hereinafter interchangeably referred to as decoder layer) includes a decoder masked multihead attention layer 192 configured to process text strings provided as the input 204 and generate decoder attention outputs, when executed by the server processor 136. The processing of the text strings includes processing the text string and the one or more preceding text strings. Each decoder 190 further includes a decoder adapter fusion 194 (hereinafter interchangeably referred to as a decoder adapter fusion layer) configured to combine and analyze the outputs from the decoder masked multi-head attention layer 192 of the first decoder layer 190-1 to generate an initial decoder risk score associated with the identification of fraudulent activity, when executed by the server processor 136. The decoder adapter fusion layer 194 contains multiple context-specific decoder adapter models, each pre-trained on datasets corresponding to different fraudulent activities. These decoder adapter models dynamically adjust to select the most relevant adapter based on the input scenario, when executed by the server processor 136. As compared to the encoder adapter models that are configured to look for specific context based on each text string, the decoder adapter models are configured to look for whole context based on a combination of the text strings. As the data passes through subsequent decoder masked multi-head attention layers 192 and decoder adapter fusion layers 194 across all layers of the remaining decoders 190, each decoder adapter fusion layer 194 iteratively refines the decoder risk score by assessing new attention outputs and contributing contextually adjusted scores. The cumulative decoder risk score of each decoder 190 is sequentially passed to the next decoder 190, ensuring a hierarchical refinement process that increases the model's accuracy in identifying any potentially fraudulent activities. Each decoder 190 also includes decoder feed forward neural network layer (FFN) 195 which is placed in between a pair of decoder add and norm layer 196. The decoder add and norm layer 196 is configured to receive output from the decoder adapter fusion 194 and perform normalization on the outputs (for example, the decoder risk score) to prevent training instability, when executed by the server processor 136. The server processor 136 is configured to forward the normalized output to the decoder FFN 195 to learn more intricate patterns of data. The decoder risk score from the plurality of decoders 190 is passed through a decoder linear layer 214 that transforms the output (for example, the decoder risk score) from the plurality of decoders 190 into a higher dimensional space, when executed by the server processor 136. The output of the decoder linear layer 214 is further normalized by the server processor 136 by processing it through a decoder softmax layer 216. The normalized output is provided to a decoder sequence classifier output layer 218 that outputs a decoder classifier decision for the text strings. The decoder outputs (for example, the decoder risk scores), decoder output states (for example, a detailed version of the decoder risk scores), and the decoder classifier decision for the text strings are stored by the server processor 136 in the hierarchical contextual memory storage 200. As each new text string is processed, the current text string is combined with a previous context (for example, the stored decoder outputs, the stored decoder risk scores, the stored output states, and the stored decoder classifier decision), analyzing the whole context for more accurate fraud detection. When the cumulative risk score across multiple text strings surpasses the predetermined risk value, the server processor 136 triggers the alert.

The hierarchical transformer AI model 160 further includes a positional encoder 201 that provides order of sequence for specific identifiers of the input 204. The positional encoding helps the hierarchical transformer AI model 160 understand the order of words in the text strings. The identifiers are further provided to plurality of encoders 170. The outputs from the plurality of encoders 170 and the plurality of decoders 190 are passed to the hierarchical contextual memory storage 200, where the final risk score is determined from combination of both the encoder risk score and the decoder risk score received.

Figure 5:
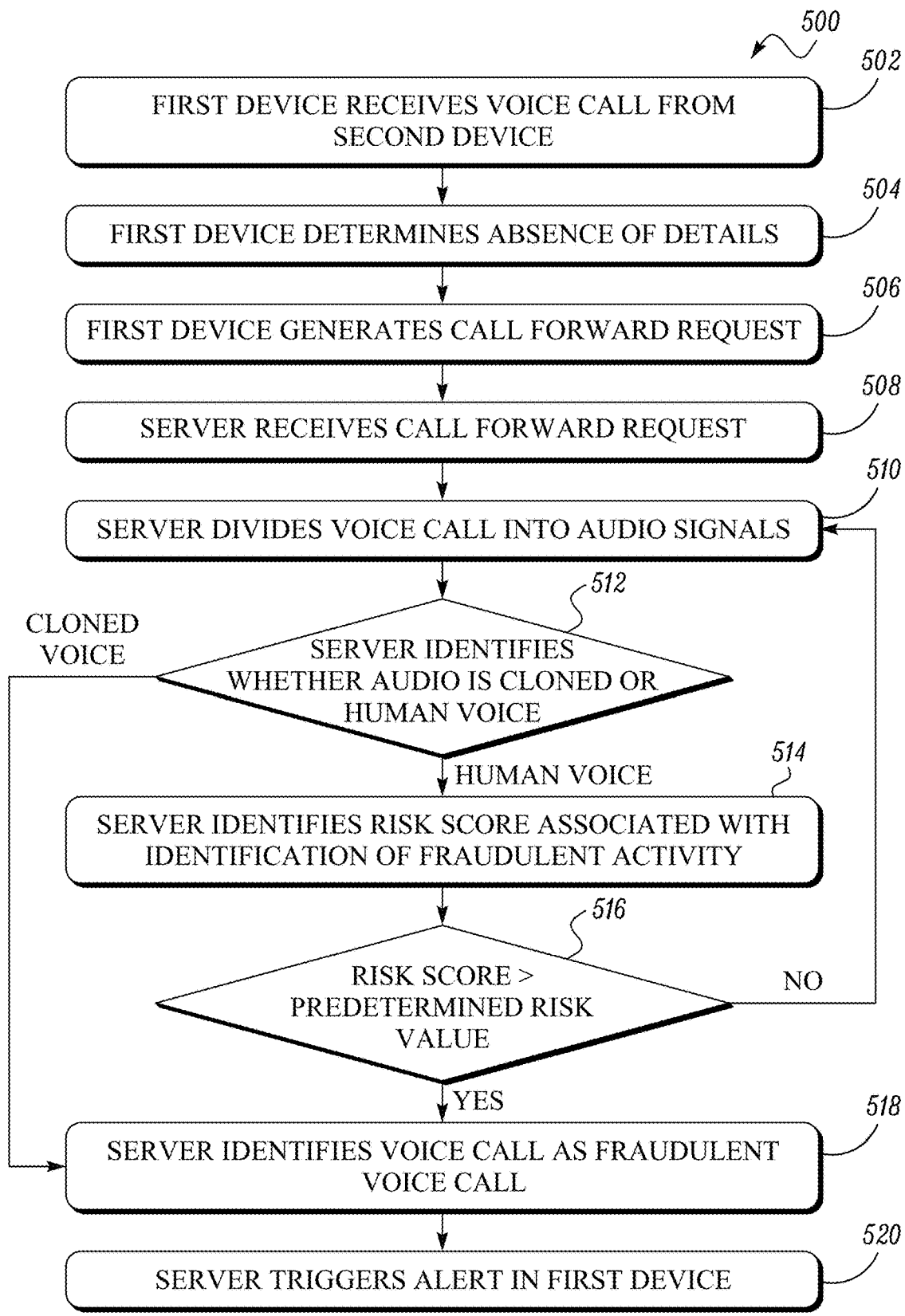
FIG. 5 illustrates an exemplary method for identification of the fraudulent voice call, in accordance with some embodiments.
Figure 6A:
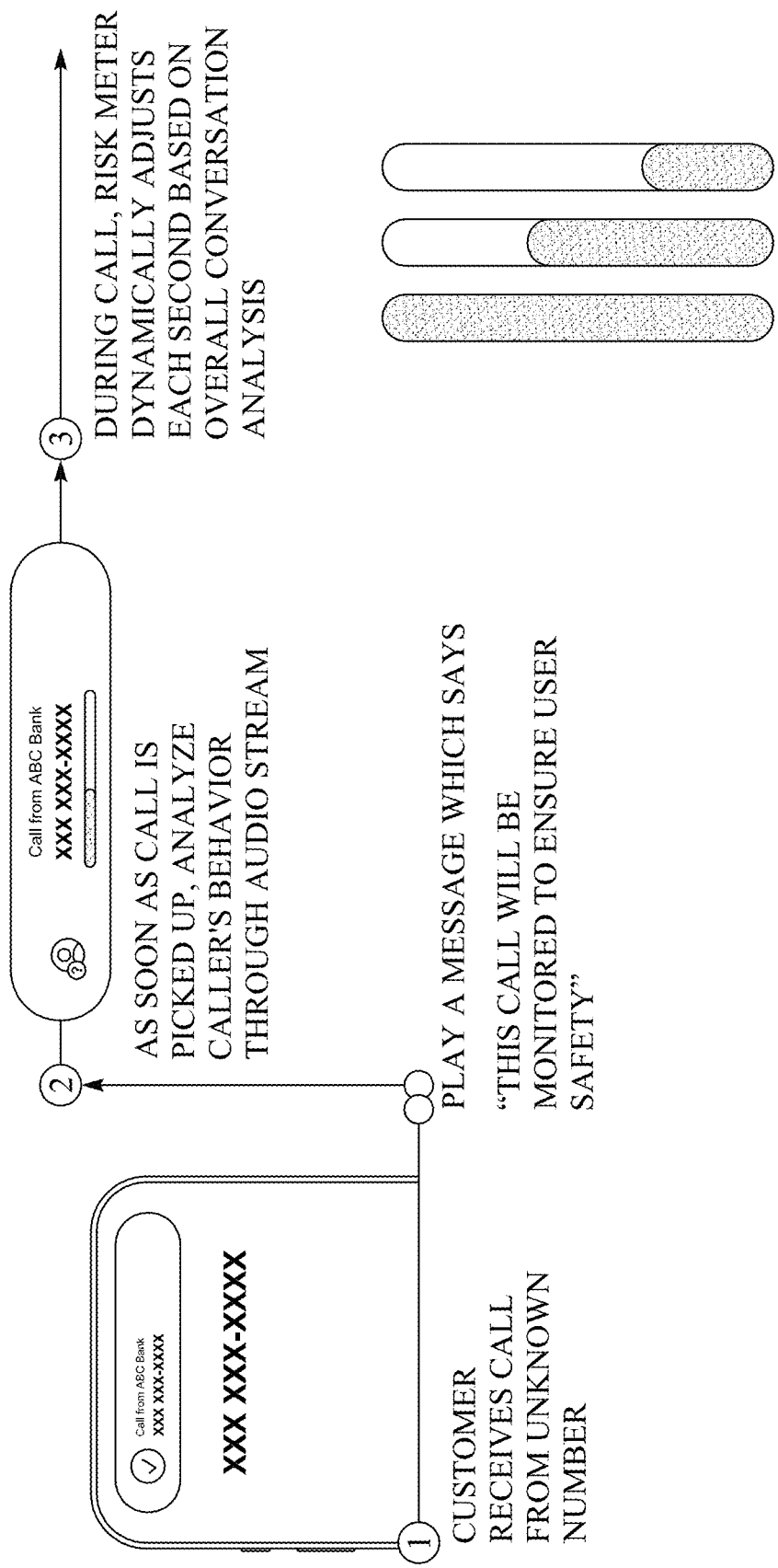
FIGS. 6A through 6D illustrate an exemplary scenario for identification of the fraudulent voice call, in accordance with some embodiments.

FIG. 5 illustrates a method 500 for identification of the fraudulent voice call in real-time. The method 500 begins with the first device 102 receiving the voice call originating from the second device 104 at 502. For example, as shown in FIG. 6A, a device (for example, the first device 102) receives the voice call at '1'. Referring back to FIG. 5, at 504, the first device 102 determines an absence of details associated with the second device 104 in the first device 102. In accordance with various embodiments, determining an absence of details associated with the second device 104 in the first device 102 includes determining that the second device 104 is unknown to the first device, for example, based on an absence of record of the second device 104, an absence of a name associated with the second device 104, an absence of phone number associated with the second device 104 in a contact list of the first device 102. At 506, the first device 102 generates the call forward request based on the absence of details of the second device 104 in the first device 102.

In some embodiments, the determination of whether to generate the call forward request depends upon the one or more user pre-defined configurations. The user pre-defined configurations can include one or more scenarios during which the call forward request is generated and transmitted by the first device 102. For example, the user pre-defined configurations include a reception of a voice call from an unknown number, a reception of a voice call from another country, reception of a voice call from any government agency, and any other configuration now known or in the future identified. The user pre-defined configurations are defined by the first user depending on the preferences of the first user. In such cases, the first device 102 upon receiving the voice call determines whether the voice call falls under the user-predefined configurations. When the voice call falls under the user pre-defined configurations, the first device 102 is configured to generate and transmit the call forward request to the server 106. In some embodiments, when the server 106 is integrated with the network servers, the server 106 is configured to automatically receive the voice call using the media forking based on the one or more user pre-defined configurations of the first device 102.

At 508, the server 106 receives the call forward request from the first device 102 via the network 108. In response to the call forward request, the server 106 divides the voice call from the second device 104 to the first device 102 into a plurality of audio signals in real time during the voice call at 510. In accordance with various embodiments, the audio signals correspond to voice transmissions during the voice call. The server 106 divides the voice call into the plurality of audio signals based on pre-defined time durations.

The server 106 further starts analyzing the plurality of audio signals to determine whether the voice call is a fraudulent voice call. For example, as shown in FIG. 6A, when the voice call is received and answered by the first device 102, the server 106 starts analyzing the audio signals to determine whether the voice call is a fraudulent voice call at '2'. In some embodiments, the server 106 also instructs the first device 102 to play a message during the voice call to let the participants know that the voice call is being monitored, as shown in FIG. 6A. To this end, the server 106 sends a communication to the first device 102 and the first device 102 upon receiving the communication plays the message.

Referring back to FIG. 5, at 512, the server 106 analyzes, using at least two artificial intelligence models (for example, the first AI model 156 and the second AI model 158), one or more audio signals originated from the second device 104 of the plurality of audio signals to identify whether an audio originating from the second device 104 is a cloned voice or a human voice. To this end, the server 106 determines, using the first AI model 156, a first confidence score indicative of whether the audio is a cloned voice or a human voice. As discussed previously herein, the first AI model 156 analyzes frequency components of the one or more audio signals originated from the second device 104 during the voice call. The server 106 further determines, using the second AI model 158, a second confidence score indicative of whether the audio is a cloned voice or a human voice. As discussed previously herein, the second AI model 158 is trained on datasets including a plurality of sample cloned voices and a plurality of sample human voices to identify the audio as a cloned voice or a human voice.

The server 106 further averages the first confidence score and the second confidence score to determine an average confidence score and identifies the audio as the cloned voice when the average confidence score is less than a predefined threshold value. When the audio is identified as the cloned voice, the method 500 proceeds to 518, otherwise the method 500 proceeds to 514 when the audio is identified as the human voice.

In accordance with some embodiments, the server 106 continuously monitors each audio signal of the plurality of audio signals to determine a change in frequency of the audio within the plurality of audio signals. For example, the change in frequency of the audio corresponds to an introduction of a new voice in the voice call or replacement of an existing voice with a new voice in the voice call. The server 106 reanalyzes, using the first AI model 156 and the second AI model 158, one or more subsequent audio signals originated from the second device 104 of the plurality of audio signals to identify whether the audio originating from the second device 104 is a cloned voice or a human voice, when the change in frequency is greater than a predefined frequency change.

At 514, the server 106 analyzes, upon reception of each audio signal of the plurality of audio signals, the audio signal along with one or more preceding audio signals to continuously determine a risk score associated with an identification of a fraudulent activity during the voice call. To this end, the server 106 converts each audio signal of the plurality of audio signals into a text string in real time, using the speech to text converter 162. The server 106 further executes the hierarchical transformer AI model 160. To this end, for each encoder 170, the encoder multihead attention layer 172 processes each text string along with one or more preceding text strings corresponding to the one or more preceding audio signals and generates encoder attention outputs. The processing includes processing one or more specific identifiers in the text string and the one or more preceding text strings. The encoder adapter fusion 174 combines and analyzes the outputs from the encoder multi-head attention layer 172 of the first encoder layer 170-1 to generate an initial encoder risk score associated with the identification of fraudulent activity. The encoder adapter fusion layer 174 contains multiple context-specific encoder adapter models, each pre-trained on datasets corresponding to different fraudulent activities. These encoder adapter models dynamically adjust to select the most relevant adapter based on the input scenario. The input scenario corresponds to the context in which the type of fraud falls into. As the data passes through subsequent encoder multi-head attention layer 172 and encoder adapter fusions 174 across all layers of encoders 170, each encoder adapter fusion layer 174 iteratively refines the encoder risk score by assessing new encoder attention outputs and contributing contextually adjusted scores. The cumulative encoder risk score of each encoder 170 is sequentially passed to the next encoder 170, ensuring a hierarchical refinement process that increases the model's accuracy in identifying the potentially fraudulent activities.

For each decoder 190, the decoder masked multihead attention layer 192 processes each text string along with the one or more preceding text strings and generate decoder attention outputs. The processing includes processing the text string and the one or more preceding text strings, the decoder adapter fusion 194 combines and analyzes the outputs from the decoder masked multi-head attention layer 192 of the first decoder layer 190-1 to generate an initial decoder risk score associated with the identification of fraudulent activity. The decoder adapter fusion layer 194 contains multiple context-specific decoder adapter models, each pre-trained on datasets corresponding to different fraudulent activities. These decoder adapter models dynamically adjust to select the most relevant adapter based on the input scenario. The input scenario corresponds to the context in which the type of fraud falls into. As the data passes through subsequent decoder masked multi-head attention layer 192 and decoder adapter fusions 194 across all layers of decoders 190, each decoder adapter fusion layer 194 iteratively refines the decoder risk score by assessing new attention outputs and contributing contextually adjusted scores. The cumulative second risk score of each decoder 190 is sequentially passed to the next decoder 190, ensuring a hierarchical refinement process that increases the model's accuracy in identifying the potentially fraudulent activities.

The server 106 then determines the risk score based on a total of (i) an average of a plurality of the encoder risk scores corresponding to the plurality of encoders 170 and (ii) an average of a plurality of the decoder risk scores corresponding to the plurality of decoders 190. As shown in FIG. 6A, the risk scores are dynamically adjusted based on the contributing contextually adjusted scores at '3'.

Figure 6B:
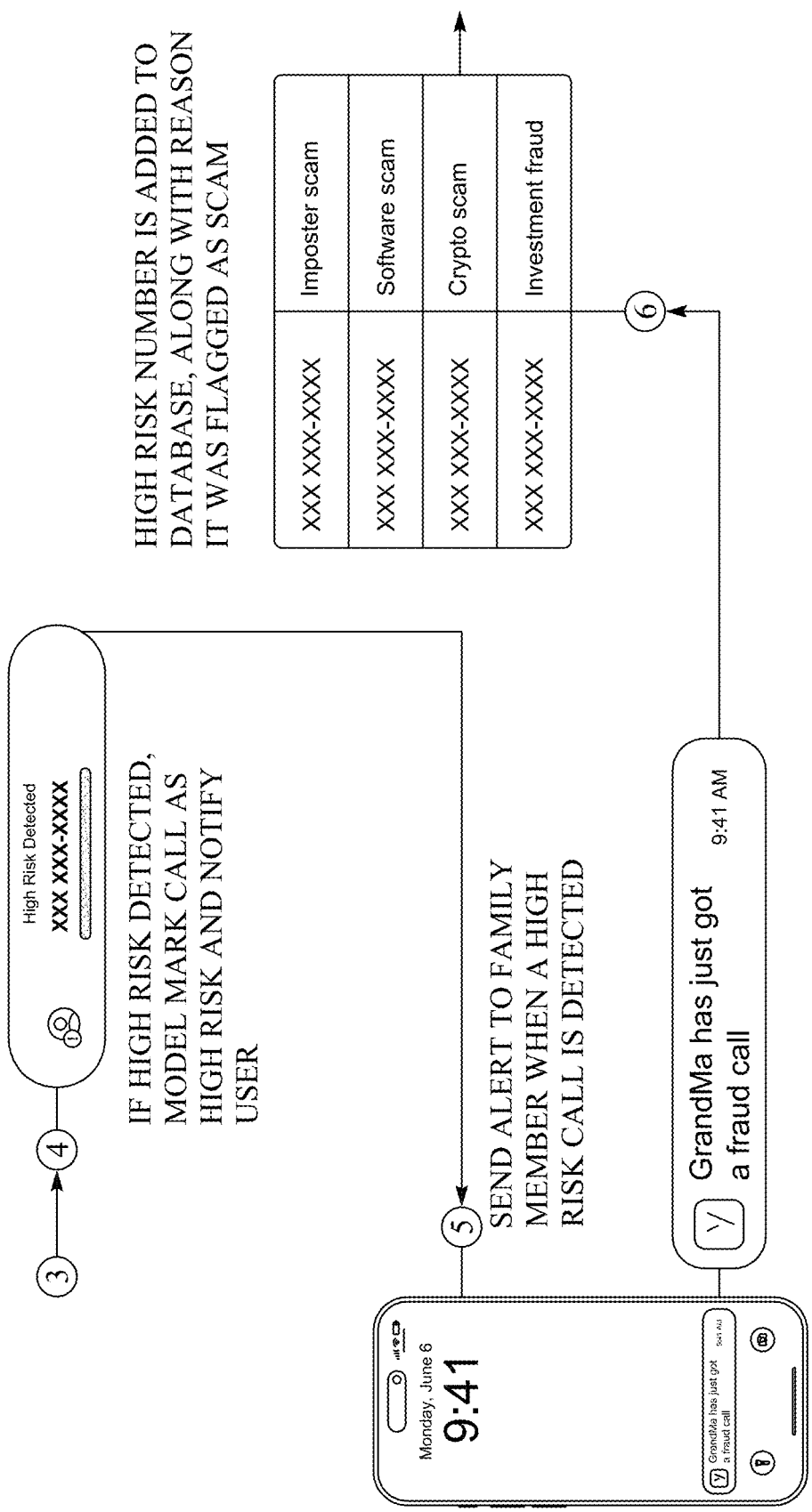

At 516, the server 106 compares the risk score with the predetermined risk value. When the risk score is greater than the predetermined risk value, the method 500 proceeds to 518. At 518, the server 106 identifies the voice call as the fraudulent voice call. When the risk score is less than the predetermined risk value, the method 500 loops back to 510. At 520, the server 106 triggers the alert in the first device 102 during the voice call to indicate that the voice call from the second device 104 is a fraudulent voice call in response to the identifying. As discussed above, the alert includes one or more of a visual alert, an audio alert, a haptic alert, and an electronic message. As shown in FIG. 6B, a message indicating the fraudulent voice call is displayed on the first device 102 at '4'.

In some embodiments, the server 106 is configured to transmit an alert message associated with the fraudulent voice call to one or more other communication devices identified by the first device 102. For example, as shown in FIG. 6B, an alert message is transmitted to another communication device (not shown) upon detection of the fraudulent voice call on the first device 102 at 'S'.

The server 106 is configured to train the first AI model 156, the second AI model 158, and the plurality of context-specific adapter models based on data associated with the fraudulent voice call. To this end, as shown in FIG. 6B, the details associated with the fraudulent voice call are added to the server data storage 150 to train the first AI model 156, the second AI model 158, the plurality of context-specific encoder adapter models, and the plurality of context-specific decoder adapter models at '6'.

Figure 6C:
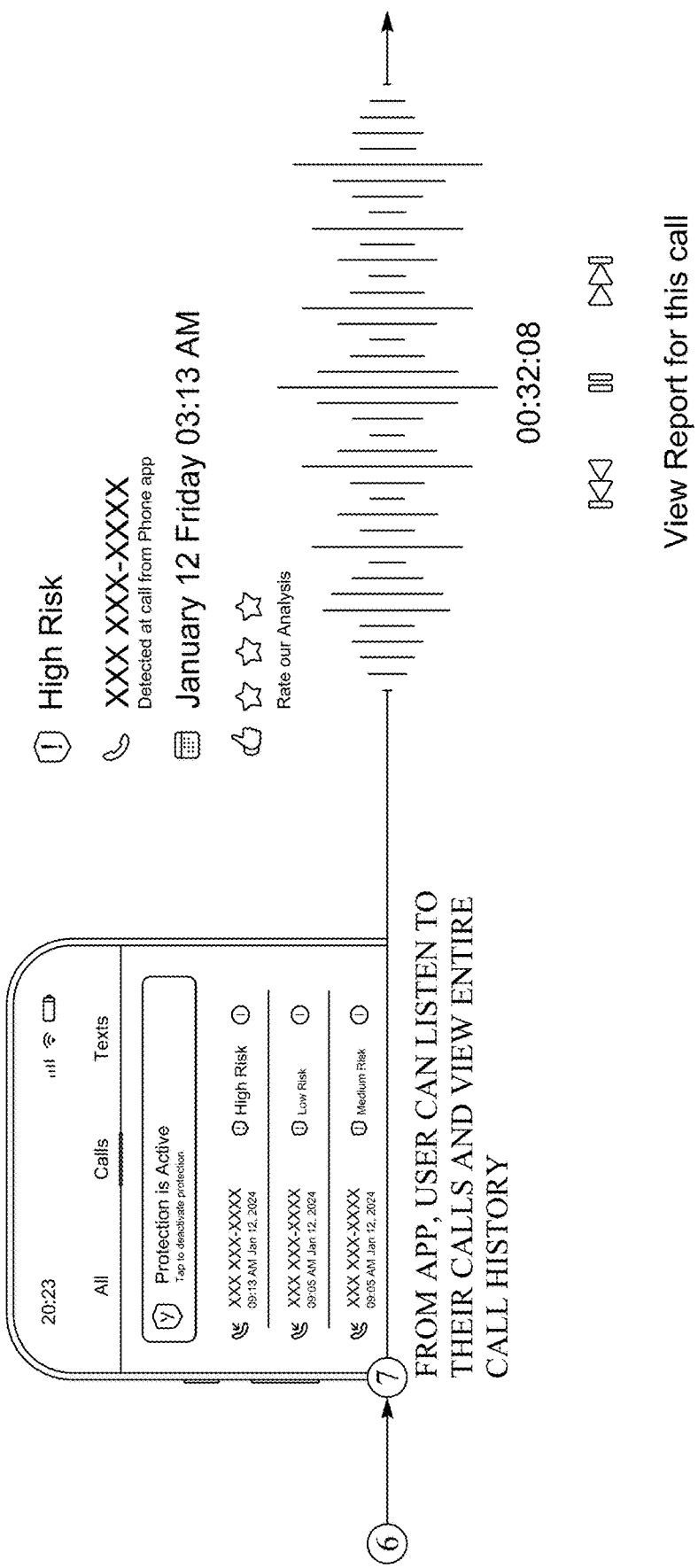
Figure 6D:
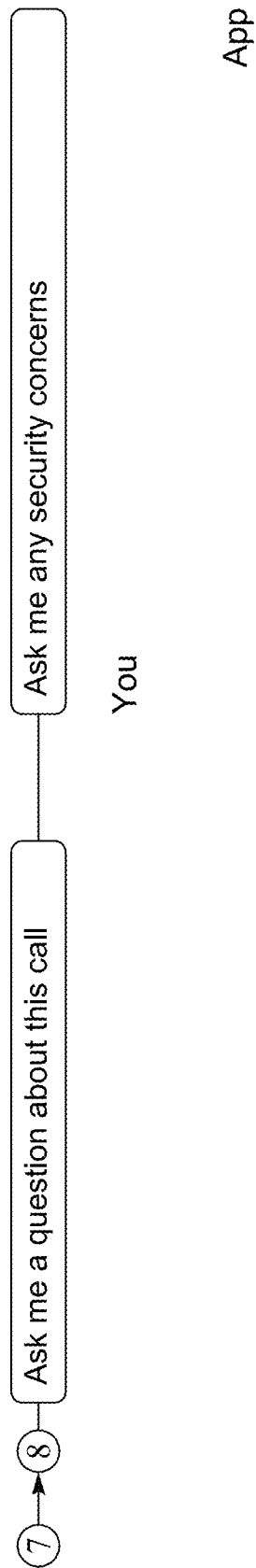

The server 106 is configured to provide recommendations and insights associated with the fraudulent voice call on the first device 102 during or after the voice call. For example, as shown in FIG. 6C, the first user can view the risk score of the voice calls in the call history and can also listen to the recordings at '7'. Further, as shown in FIG. 6D, the server 106 enables the first user to ask questions about the voice call and get recommendations and/or insights associated with the fraudulent voice call at '8'. For example, the server 106 can provide explanations as to why the voice call is identified as the fraudulent voice call.

The system and the method of the present description enables real-time identification and notification of a fraudulent voice call, thereby preventing any unauthorized disclosure of sensitive information. The present description employs AI models that not only detects the cloned voice at the initiation of the voice call, but also continuously keep checking for the new voices in the voice call to ensure that any cloned voice introduced during the voice call is successfully detected. The system and the method of the present description also enables the user to get insights and recommendations associated with the fraudulent voice call, so that the user can make an informed decision with respect to the fraudulent voice call.

In the hereinbefore specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that can cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover, in this document, relational terms such as first and second, top and bottom, and the like are used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but includes other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but also be configured in ways that are not listed.

It will be appreciated that some embodiments are comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A system for identification of a fraudulent voice call in real-time, the system comprising:
a first device communicatively coupled through a network to a second device, the first device configured to:
receive a voice call originating from the second device;
determine an absence of details associated with the second device in the first device; and
generate a call forward request based on the absence of details;

a server communicatively coupled to the first device and the second device through the network, the server configured to:
  receive the call forward request from the first device via the network; and in response to the call forward request:
  divide the voice call from the second device to the first device into a plurality of audio signals in real time during the voice call;
  analyze, using at least two artificial intelligence models, one or more audio signals originated from the second device of the plurality of audio signals to identify whether an audio originating from the second device is a cloned voice or a human voice, wherein analyzing the one or more audio signals to identify whether the audio is a cloned voice or a human voice includes:
    determining, using a first artificial intelligence model of the at least two artificial intelligence models, a first confidence score indicative of whether the audio is a cloned voice or a human voice, wherein the first artificial intelligence model analyzes frequency components of the one or more audio signals originated from the second device during the voice call,
    determining, using a second artificial intelligence model of the at least two artificial intelligence model, a second confidence score indicative of whether the audio is a cloned voice or a human voice, wherein the second artificial intelligence model is trained on datasets including a plurality of sample cloned voices and a plurality of sample human voices to identify the audio as a cloned voice or a human voice,
    averaging the first confidence score and the second confidence score to determine an average confidence score, and
    identifying the audio as the cloned voice when the average confidence score is less than a predefined threshold value;
  analyze, upon reception of each audio signal of the plurality of audio signals, the audio signal along with one or more preceding audio signals to continuously determine a risk score associated with an identification of a fraudulent activity during the voice call:
  identify the voice call as the fraudulent voice call upon identifying the audio originating from the second device as a cloned voice or when the risk score associated with the identification of the fraudulent activity during the voice call is greater than a predetermined risk value; and
  trigger an alert in the first device during the voice call to indicate that the voice call from the second device is a fraudulent voice call in response to the identifying.

2. The system of claim 1, wherein the server is further configured to:
  continuously monitor each audio signal of the plurality of audio signals to determine a change in frequency of the audio within the plurality of audio signals; and
  reanalyzing, using the at least two artificial intelligence models, one or more subsequent audio signals originated from the second device of the plurality of audio signals to identify whether the audio originating from the second device is a cloned voice or a human voice, when the change in frequency is greater than a predefined frequency change.

3. The system of claim 1, wherein the server further includes:
  a speech to text converter configured to convert each audio signal of the plurality of audio signals into a text string in real time; and
  a transformer artificial intelligence (AI) model including a plurality of encoders arranged in a hierarchical order, wherein each encoder includes:
    an encoder multihead attention layer configured to process each text string along with one or more preceding text strings corresponding to the one or more preceding audio signals and generate encoder attention outputs, wherein the processing includes processing one or more specific identifiers in the text string and the one or more preceding text strings; and
    an encoder adapter fusion layer configured to combine and analyze the encoder attention outputs from the encoder multihead attention layer of a first encoder to generate an initial encoder risk score associated with an identification of the fraudulent activity, wherein the encoder adapter fusion layer includes a plurality of context-specific encoder adapter models, each context-specific encoder adapter model is pre-trained on datasets corresponding to different fraudulent activities, further wherein each context-specific encoder adapter model is configured to dynamically adjust to select a relevant encoder adapter based on an input scenario, and
    wherein as the data passes through subsequent encoder multi-head attention layers and encoder adapter fusion layers across the all layers of encoders, each encoder adapter fusion layer iteratively refines the encoder risk score by assessing new encoder attention outputs and contributing contextually adjusted scores, wherein a cumulative encoder risk score of each encoder is sequentially passed to the next encoder.

4. The system of claim 3, wherein the transformer AI model further includes a plurality of decoders arranged in a hierarchical order, wherein each decoder includes:
  a decoder masked multihead attention layer configured to process each text string along with the one or more preceding text strings and generate decoder attention outputs, wherein the processing includes processing the text string and the one or more preceding text strings; and
  a decoder adapter fusion layer configured to combine and analyze the decoder attention outputs from the decoder masked multihead attention layer of a first decoder to generate an initial decoder risk score associated with an identification of the fraudulent activity, wherein the decoder adapter fusion layer includes a plurality of context-specific decoder adapter models, each context-specific decoder adapter model is pre-trained on datasets corresponding to different fraudulent activities, further wherein each context-specific decoder adapter model is configured to dynamically adjust to select a relevant decoder adapter based on an input scenario, and
  wherein as the data passes through subsequent decoder masked multi-head attention layers and decoder adapter fusion layers across the all layers of decoders, each decoder adapter fusion layer iteratively refines the decoder risk score by assessing new decoder attention outputs and contributing contextually adjusted scores, wherein a cumulative decoder risk score of each decoder is sequentially passed to the next decoder.

5. The system of claim 4, wherein the risk score is determined based on a total of: (i) an average of a plurality of the encoder risk scores corresponding to the plurality of encoders and (ii) an average of a plurality of the decoder risk scores corresponding to the plurality of decoders.

6. The system of claim 4, wherein the server is configured to train the at least two artificial intelligence models and the plurality of context-specific adapter models based on data associated with the fraudulent voice call.

7. The system of claim 1, wherein the alert includes one or more of a visual alert, an audio alert, a haptic alert, and an electronic message.

8. The system of claim 1, wherein the server is further configured to provide recommendations and insights associated with the fraudulent voice call on the first device during or after the voice call.

9. The system of claim 1, wherein the server is further configured to transmit an alert message associated with the fraudulent voice call to one or more other communication devices identified by the first device.

10. A method for identification of a fraudulent voice call in real-time, the method comprising:
   receiving, by a first device communicatively coupled through a network to a second device, a voice call originating from the second device;
   determining, by the first device, an absence of details associated with the second device in the first device;
   generating, by the first device, a call forward request based on the absence of details;
   receiving, by a server communicatively coupled to the first device and the second device through the network, the call forward request from the first device via the network; and
   in response to the call forward request:
      dividing, by the server, the voice call from the second device to the first device into a plurality of audio signals in real time during the voice call;
      analyzing, by the server using at least two artificial intelligence models, one or more audio signals originated from the second device of the plurality of audio signals to identify whether an audio originating from the second device is a cloned voice or a human voice wherein analyzing the one or more audio signals to identify whether the audio is a cloned voice or a human voice includes:
         determining, by the server using a first artificial intelligence model of the at least two artificial intelligence models, a first confidence score indicative of whether the audio is a cloned voice or a human voice, wherein the first artificial intelligence model analyzes frequency components of the one or more audio signals originated from the second device during the voice call,
         determining, by the server using a second artificial intelligence model of the at least two artificial intelligence models, a second confidence score indicative of whether the audio is a cloned voice or a human voice, wherein the second artificial intelligence model is trained on datasets including a plurality of sample cloned voices and a plurality of sample human voices to identify the audio as a cloned voice or a human voice,
         averaging, by the server, the first confidence score and the second confidence score to determine an average confidence score, and
      identifying, by the server, the audio as the cloned voice when the average confidence score is less than a predefined threshold value;
      analyzing, by the server, upon reception of each audio signal of the plurality of audio signals, the audio signal along with one or more preceding audio signals to continuously determine a risk score associated with an identification of a fraudulent activity during the voice call;
      identifying, by the server, the voice call as the fraudulent voice call upon identifying the audio originating from the second device as a cloned voice or when the risk score associated with the identification of the fraudulent activity during the voice call is greater than a predetermined risk value; and
      triggering, by the server, an alert in the first device during the voice call to indicate that the voice call from the second device is a fraudulent voice call in response to the identifying.

11. The method of claim 10, further including:
   continuously monitoring, by the server, each audio signal of the plurality of audio signals to determine a change in frequency of the audio within the plurality of audio signals; and
   reanalyzing, by the server using the at least two artificial intelligence models, one or more subsequent audio signals originated from the second device of the plurality of audio signals to identify whether the audio originating from the second device is a cloned voice or a human voice, when the change in frequency is greater than a predefined frequency change.

12. The method of claim 10, further including:
   converting, by a speech to text converter of the server, each audio signal of the plurality of audio signals into a text string in real time; and
   processing, by an encoder multihead attention layer of each encoder of a plurality of encoders of a transformer artificial intelligence (AI) model in the server, each text string along with one or more preceding text strings corresponding to the one or more preceding audio signals and generating encoder attention outputs, wherein the processing includes processing one or more specific identifiers in the text string and the one or more preceding text strings; and
   combining and analyzing, by an encoder adapter fusion layer of each encoder, the encoder attention outputs from the encoder multihead attention layer of a first encoder to generate an initial encoder risk score associated with an identification of the fraudulent activity, wherein the encoder adapter fusion layer includes a plurality of context-specific encoder adapter models, each context-specific encoder adapter model is pre-trained on datasets corresponding to different fraudulent activities, further wherein each context-specific encoder adapter model is configured to dynamically adjust to select a relevant encoder adapter based on an input scenario, and
   passing the data through subsequent encoder multi-head attention layers and encoder adapter fusion layers across the all layers of encoders, each encoder adapter fusion layer iteratively refines the encoder risk score by assessing new encoder attention outputs and contributing contextually adjusted scores, wherein a cumulative encoder risk score of each encoder is sequentially passed to the next encoder.

13. The method of claim 12, further including:
processing, by a decoder masked multihead attention layer of each decoder of a plurality of decoders of the transformer AI, each text string along with the one or more preceding text strings and generating decoder attention outputs, wherein the processing includes processing the text string and the one or more preceding text strings; and
combining and analyzing, by a decoder adapter fusion layer of each decoder, the decoder attention outputs from the decoder masked multihead attention layer of a first decoder to generate an initial decoder risk score associated with an identification of the fraudulent activity, wherein the decoder adapter fusion layer includes a plurality of context-specific decoder adapter models, each context-specific decoder adapter model is pre-trained on datasets corresponding to different fraudulent activities, further wherein each context-specific decoder adapter model is configured to dynamically adjust to select a relevant decoder adapter based on an input scenario, and
passing the data through subsequent decoder masked multi-head attention layers and decoder adapter fusion layers across the all layers of decoders, each decoder adapter fusion layer iteratively refines the decoder risk score by assessing new decoder attention outputs and contributing contextually adjusted scores, wherein a cumulative decoder risk score of each decoder is sequentially passed to the next decoder.

14. The method of claim 13, wherein the risk score is determined based on a total of: (i) an average of a plurality of the encoder risk scores corresponding to the plurality of encoders and (ii) an average of a plurality of the decoder risk scores corresponding to the plurality of decoders.

15. The method of claim 13, further including:
training the at least two artificial intelligence models and the plurality of context-specific adapter models based on data associated with the fraudulent voice call.

16. The method of claim 15, wherein the alert includes one or more of a visual alert, an audio alert, a haptic alert, and an electronic message.

17. The method of claim 10, further including:
providing, by the server, recommendations and insights associated with the fraudulent voice call on the first device during or after the voice call.

18. A system for identification of a fraudulent voice call in real-time, the system comprising:
a server communicatively coupled to a first device and a second device through a network, the server configured to:
obtain a voice call originating from the second device to the first device;
divide the voice call from the second device to the first device into a plurality of audio signals in real time during the voice call;
analyze, using at least two artificial intelligence models, one or more audio signals originated from the second device of the plurality of audio signals to identify whether an audio originating from the second device is a cloned voice or a human voice wherein analyzing the one or more audio signals to identify whether the audio is a cloned voice or a human voice includes:
determining, using a first artificial intelligence model of the at least two artificial intelligence models, a first confidence score indicative of whether the audio is a cloned voice or a human voice, wherein the first artificial intelligence model analyzes frequency components of the one or more audio signals originated from the second device during the voice call,
determining, using a second artificial intelligence model of the at least two artificial intelligence model, a second confidence score indicative of whether the audio is a cloned voice or a human voice, wherein the second artificial intelligence model is trained on datasets including a plurality of sample cloned voices and a plurality of sample human voices to identify the audio as a cloned voice or a human voice,
averaging the first confidence score and the second confidence score to determine an average confidence score, and
identifying the audio as the cloned voice when the average confidence score is less than a predefined threshold value;
analyze, upon reception of each audio signal of the plurality of audio signals, the audio signal along with one or more preceding audio signals to continuously determine a risk score associated with an identification of a fraudulent activity during the voice call;
identify the voice call as the fraudulent voice call upon identifying the audio originating from the second device as a cloned voice or when the risk score associated with the identification of the fraudulent activity during the voice call is greater than a predetermined risk value; and
trigger an alert in the first device during the voice call to indicate that the voice call from the second device is a fraudulent voice call in response to the identifying.

* * * * *